United States Patent
Hwang et al.

(10) Patent No.: US 8,922,577 B2
(45) Date of Patent: Dec. 30, 2014

(54) TEXTURE INFORMATION PROVIDER AND FRAME SYNTHESZIER FOR IMAGE PROCESSING APPARATUS AND METHOD

(75) Inventors: Kyu Young Hwang, Hwaseong-si (KR); Yang Ho Cho, Hwaseong-si (KR); Ho Young Lee, Suwon-si (KR); Du Sik Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 649 days.

(21) Appl. No.: 12/907,411

(22) Filed: Oct. 19, 2010

(65) Prior Publication Data

US 2011/0157208 A1   Jun. 30, 2011

(30) Foreign Application Priority Data

Dec. 28, 2009   (KR) .................. 10-2009-0131853

(51) Int. Cl.
*G09G 5/00* (2006.01)
*G06T 3/40* (2006.01)

(52) U.S. Cl.
CPC .................................. *G06T 3/40* (2013.01)

USPC ............................................ 345/582

(58) Field of Classification Search
USPC ............................................ 345/582
See application file for complete search history.

(56) References Cited

U.S. PATENT DOCUMENTS

| 8,204,123 | B2 * | 6/2012 | Tokumitsu et al. ....... | 375/240.16 |
| 2007/0160136 | A1 * | 7/2007 | Lee et al. ................ | 375/240.1 |
| 2009/0238492 | A1 * | 9/2009 | Lenke ...................... | 382/300 |
| 2011/0261882 | A1 * | 10/2011 | Zheng et al. ............ | 375/240.13 |

FOREIGN PATENT DOCUMENTS

| JP | 2008-98691 | 4/2008 |
| JP | 2008-109625 | 5/2008 |
| JP | 2008-306330 | 12/2008 |
| KR | 10-2007-0020994 | 2/2007 |

\* cited by examiner

*Primary Examiner* — David Zarka
*Assistant Examiner* — Vu Nguyen
(74) *Attorney, Agent, or Firm* — Staas & Halsey LLP

(57) ABSTRACT

Provided is an image processing apparatus. The image processing apparatus may synthesize an input frame with texture information of another frame and provide an output frame with an enhanced texture component.

25 Claims, 12 Drawing Sheets

TEXTURE INFORMATION PROVIDER AND FRAME SYNTHESZIER FOR IMAGE PROCESSING APPARATUS AND METHOD

CROSS-REFERENCE TO RELATED APPLICATIONS

This application claims the benefit of Korean Patent Application No. 10-2009-0131853, filed on Dec. 28, 2009, in the Korean Intellectual Property Office, the disclosure of which is incorporated herein by reference.

BACKGROUND

1. Field

One or more embodiments relate to an image processing apparatus and method that may enhance a texture component of an image.

2. Description of the Related Art

To increase a viewer's sense of realism and immersive sensation, a display device is rapidly becoming larger and comes to have a high resolution. However, the development of image contents is far behind the development of the display device. For example, only a small number of high resolution image contents may satisfy a high resolution display corresponding to a high definition (HD) or an ultra definition (UD) class. In this instance, a low resolution image content may be transformed to a high resolution image, whereas a texture component of the transformed high resolution image may be blurred. Accordingly, a user using the high resolution display device may not realize details of image contents.

SUMMARY

Additional aspects and/or advantages will be set forth in part in the description which follows and, in part, will be apparent from the description, or may be learned by practice of the invention.

According to an aspect of one or more embodiments, there may be provided an image processing apparatus including a texture information provider to provide texture information of a first frame, and a frame synthesizer to output a second frame containing texture information of the first frame.

According to another aspect of one or more embodiments, there may be provided an image processing method including providing texture information of a first frame, and outputting a second frame containing texture information of the first frame.

BRIEF DESCRIPTION OF THE DRAWINGS

These and/or other aspects and advantages will become apparent and more readily appreciated from the following description of the exemplary embodiments, taken in conjunction with the accompanying drawings of which.

DETAILED DESCRIPTION

Reference will now be made in detail to exemplary embodiments, examples of which are illustrated in the accompanying drawings, wherein like reference numerals refer to the like elements throughout. Exemplary embodiments are described below to explain the present disclosure by referring to the figures.

Figure 1:
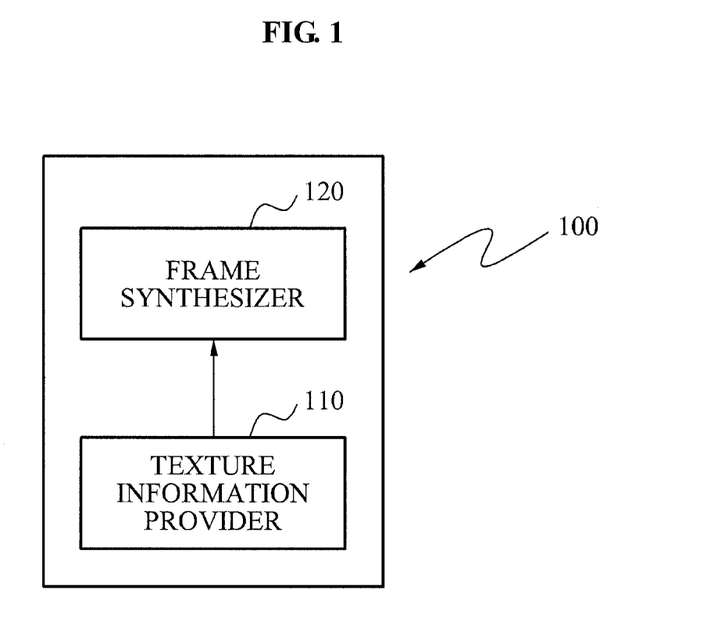
FIG. 1 illustrates an image processing apparatus according to an embodiment.

FIG. 1 illustrates an image processing apparatus 100 according to an embodiment. The image processing apparatus 100 which may be a computer including a display, may process an input image based on a frame unit. The image processing apparatus 100 may sequentially process each single frame at a one time, and may also process a plurality of frames in parallel.

The image processing apparatus 100 may enhance a texture component of an input frame. Compared to a frame input into the image processing apparatus 100, a frame output from the image processing apparatus 100 may have an enhanced clearness in a texture area. The image processing apparatus 100 may include a texture information provider 110 and a frame synthesizer 120.

The texture information provider 110 may provide texture information of the input frame to the frame synthesizer 120. The texture information provider 110 may provide texture information of a frame targeted to enhance a texture component (hereinafter, a base frame) and may also provide texture information of a reference frame. The base frame and the reference frame may indicate two frames that are temporally the rear and the front. For example, the reference frame may denote a temporarily preceding frame compared to the base frame. The base frame and the reference frame may also indicate two frames having different viewpoints. For example, the base frame and the reference frame may be photographed by targeting the same object at different viewpoints. Also, the reference frame may denote a frame to be referred to when encoding or decoding the base frame. A relationship between the base frame and the reference frame may be defined according to various types of criteria.

Texture information provided by the texture information provider 110 may have an enhanced value compared to original texture information of the input frame. For example, when filtering the input frame using a plurality of filters having different frequency bands, applying a higher weight to a result filtered from a filter of a frequency band having a high visual sensitiveness of a human being, and then adding up the filtering results, it is possible to obtain an enhanced result compared to original texture information.

Figure 2:
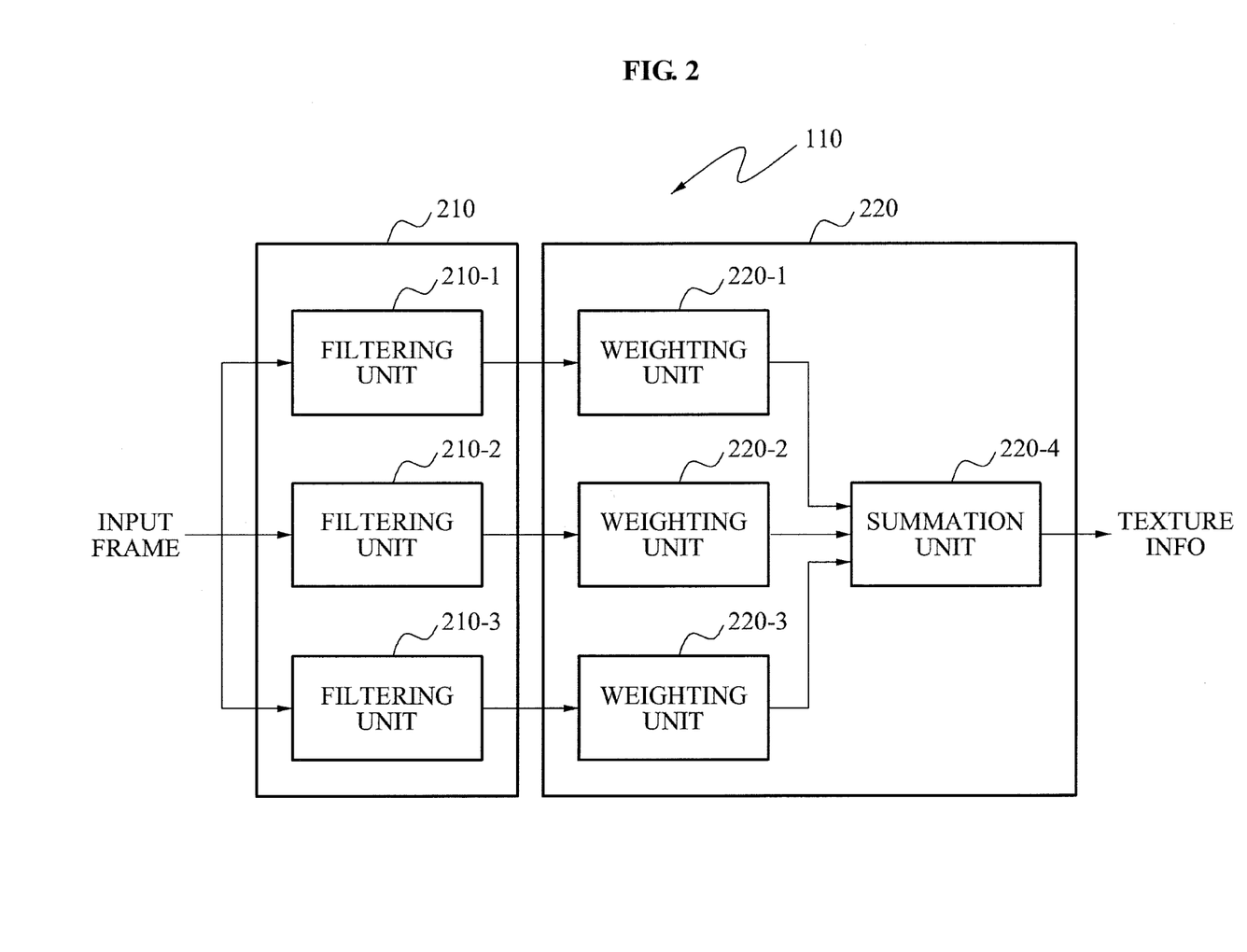
FIG. 2 illustrates an embodiment of a texture information provider of FIG. 1.

FIG. 2 illustrates an embodiment of the texture information provider 110 of FIG. 1. Referring to FIG. 2, the texture information provider 110 may include an extractor 210 and a texture processor 220.

The extractor 210 may extract texture information from an input frame. The texture information may be obtained by extracting a component corresponding to a particular frequency band from the input frame. For example, the texture information may be expressed as a high frequency component in a frequency domain. When the input frame is filtered using a frequency band that generally expresses texture information, texture information of the input frame may be extracted.

The extractor 210 may include filtering units 210-1, 210-2, and 210-3. A number of filtering units may vary upon embodiments. Each of the filtering units 210-1, 210-2, and 210-3 may include a high pass filter (not shown) having a different pass band. The pass band of the high pass filter may be determined through a pre-experiment to be a frequency band having a high relationship with texture information verified or to be a frequency band having a high visual sensitiveness of a human being. In this example, the input frame may be filtered by each of the filtering units 210-1, 210-2, and 210-3 and a high frequency component constituting the texture information may be obtained.

Figure 3:
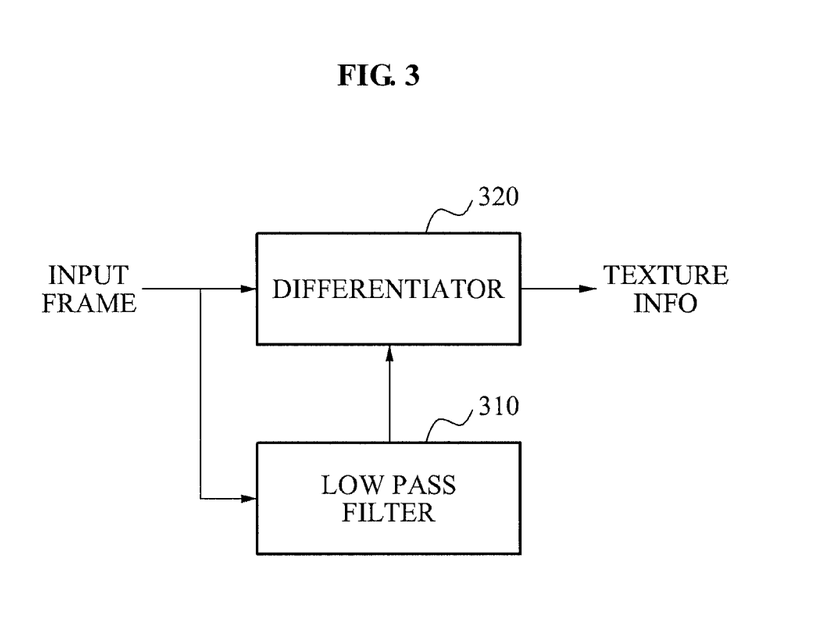
FIG. 3 illustrates an embodiment of a filtering unit of FIG. 2.

As another embodiment, as shown in FIG. 3, each of the filtering units 210-1, 210-2, and 210-3 may include a low pass filter 310 and a differentiator 320. A pass band of the low pass filter 310 may be different for each filtering unit, and may filter the input frame using a low frequency band. The pass band of the low pass filter 310 may be determined through a pre-experiment to be a frequency band having a low relationship with texture information or to be a frequency band having a low visual sensitiveness of a human being. The differentiator 320 may differentiate, from original input frame, the input frame of the low frequency band filtered by the low pass filter 310. In this case, the input frame may be filtered by each of the filtering units 210-1, 210-2, and 210-3 and the high frequency component constituting the texture information may be obtained.

The extractor 210 may be constructed using a frequency selective filter bank such as a Gabor filter. The extractor 210 may extract texture information from the input frame using various types of methods.

The texture processor 220 may enhance texture information extracted by the extractor 210. Enhancing of the texture information may indicate changing of data so that a texture component may be visually further abundant. In FIG. 2, the texture processor 220 may include weighting units 220-1, 220-2, and 220-3, and a summation unit 220-4. The weighting units 220-1, 220-2, and 220-3 may apply a weight to a filtering result of respective corresponding filtering units 210-1, 210-2, and 210-3. The summation unit 220-4 may add up the results with the applied weight. The weight to be applied by the 210-1, 210-2, and 210-3 may be preset to be a higher value as the filtering result of respective corresponding filtering units 210-1, 210-2, and 210-3 is more sensitive to a visual characteristic of a human being. Accordingly, a higher weight may be applied to a result filtered using a frequency band having a high visual sensitiveness. The texture processor 220 is only an example and thus a type of the texture processor 220 is not limited thereto.

According to the embodiment of FIG. 2, a difference may occur between texture information provided by the texture information provider 110 and original texture information of the input frame. However, it is only an example. Depending on embodiments, texture information provided by the texture information provider 110 may have the same value as original texture information of the input frame.

Referring again to FIG. 1, the frame synthesizer 120 may output a frame including texture information of a base frame and texture information of a reference information. Synthesizing of texture information may indicate reflecting texture information of the reference frame to the base frame such as a sum or a weighted sum of texture information of the reference frame and texture information of the base frame.

Figure 4:
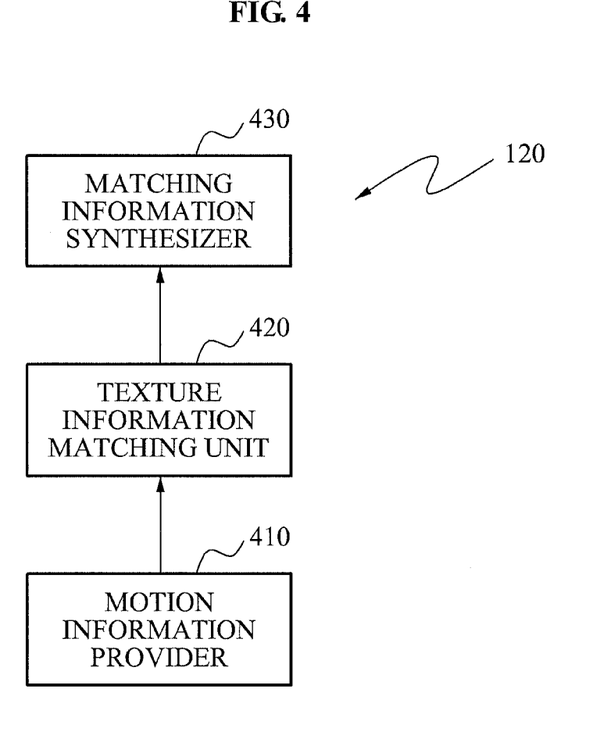
FIG. 4 illustrates an embodiment of a frame synthesizer of FIG. 1.

FIG. 4 illustrates an embodiment of the frame synthesizer 120 of FIG. 1. The frame synthesizer 120 may include a motion information provider 410, a texture information matching unit 420, and a matching information synthesizer 430.

The motion information provider 410 may provide motion information of a base frame. For example, the motion information may include a motion vector obtained using a block matching algorithm. The motion information may have been obtained already in a pre-processing operation of the base frame, for example, in a coding or decoding operation of the base frame. It is only an example and thus various types of examples may be applicable.

The texture information matching unit 420 may generate matching information including texture information of a reference frame and texture information of the base frame. For example, the texture information matching unit 420 may determine a location where texture information of the reference frame is synthesized with the base frame, based on the motion information provided by the motion information provider 410, and may synthesize corresponding texture information with respect to each determined location.

Figure 5:
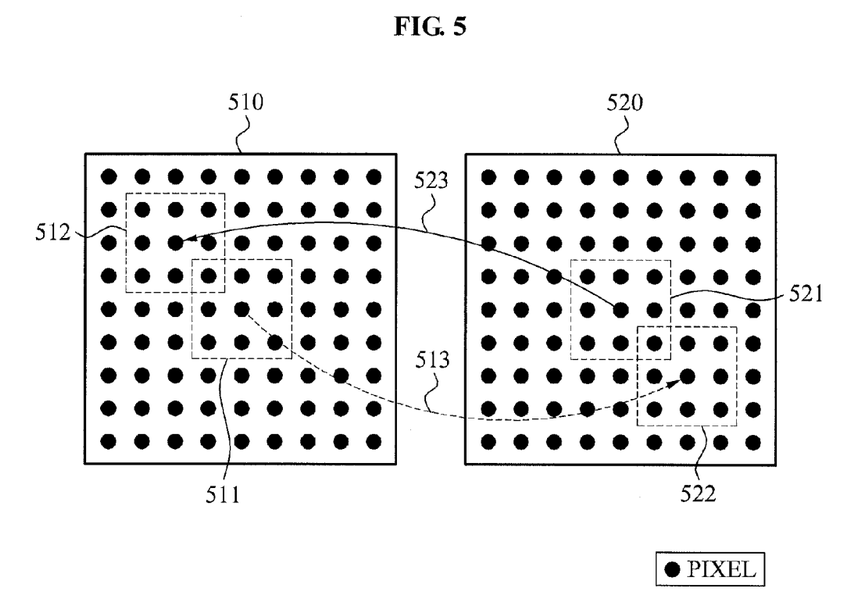
FIG. 5 illustrates a process of determining a location where texture information of a reference frame is synthesized according to an embodiment.

A process of determining a location where texture information of the reference frame is synthesized will be described with reference to FIG. 5. FIG. 5 illustrates a reference frame 510 and a base frame 520. The reference frame 510 and the base frame 520 may include texture information provided by the texture information provider 110 of FIG. 1. The reference frame 510 and the base frame 520 are provided to have a size of 9×9 pixels. Although all the pixels are expressed in black, it is only an example.

An area of the reference frame 510 having coordinates corresponding to a base area 521 of the base frame 520 is referred to as a reference area 511. The base area 521 has a size of 3×3 pixels, however, is not limited thereto. The base area 521 may include a single pixel or a plurality of pixels, and may have the same size as a block of extracting or applying a motion vector when encoding and decoding the reference frame 520.

To determine an area of the base frame 520 including texture information to be synthesized with texture information included in the reference area 511, the texture information matching unit 420 may use a motion vector 523 of the base area 521. For example, the texture information matching unit 420 may determine a matching area 522 to match texture information included in the reference area 511, based on an inverse 513 of the motion vector 523 of the base area 521.

The motion vector 523 of the base area 521 indicates that a corresponding area 512 of the reference frame 510 is the same as or most similar to the base area 521 of the base frame 520. The corresponding area 512 is spaced apart from the left and the top of the reference area 511 by each two pixels. Accordingly, when the inverse vector 513 having an inverse value of the motion vector 523 is applied to the reference area 511, the matching area 522 may be formed at a location spaced apart from the right and the bottom of the base area 521 by each two pixels.

When the matching area 522 is determined, the texture information matching unit 420 may synthesize texture information of the reference area 511 with texture information of the matching area 522. Both texture information of the reference area 511 and texture information of the matching area 522 may be provided by the texture information provider 110.

The texture information matching unit 420 may perform a texture information matching operation while changing the base area 521 in the base frame 520. Matching information provided by the texture information matching unit 420 may be expressed by, $$P_{total}(i-MV_{x,k}, j-MV_{y,k}) = P_{current}(i-MV_{x,k}, j-MV_{y,k}) + p_{reference}(i,j)$$ [Equation 1]

In Equation 1, i and j denote x, y coordinates of a pixel, $MV_{x,k}$ and $MV_{y,k}$ denote an x component and a y component of a motion vector used for matching, for example, a motion vector of a base area, $P_{total}$ denotes matching information, $p_{current}$ denotes texture information of the base area, and $p_{reference}$ denotes texture information of a reference area.

Figure 6:
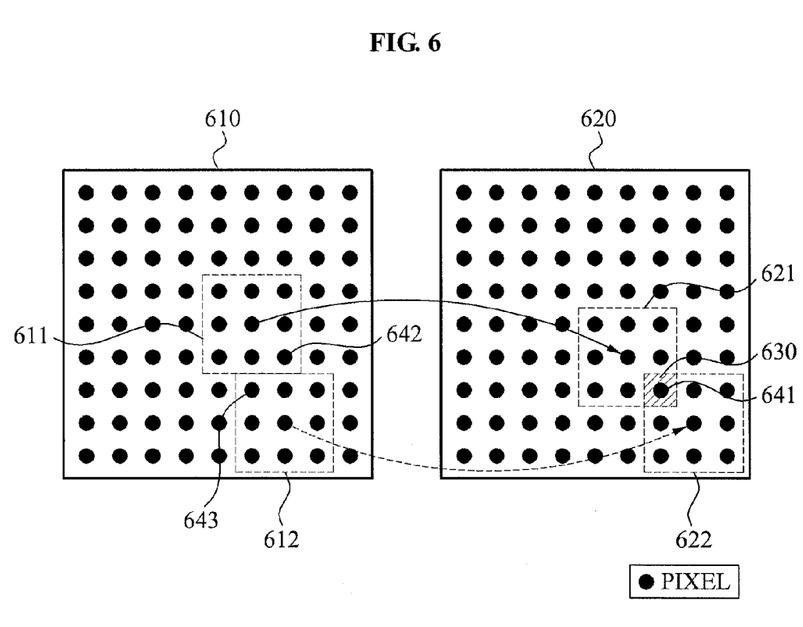
FIG. 6 illustrates a process of determining a location where texture information of a reference frame is synthesized according to another embodiment.

Referring to FIG. 6, matching areas 621 and 622 of a base frame 620 corresponding to different reference areas 611 and 612 of a reference frame 610 may be partially overlapped with each other. In this example, texture information may be overlappingly synthesized in an overlapping area 630. A pixel 641 of the overlapping area 630 may include all of texture information of the pixel 641, texture information of a pixel 642, and texture information of a pixel 643.

Referring again to FIG. 4, the matching information synthesizer 430 may synthesize a base frame with matching information provided by the texture information matching unit 420. Depending on a synthesis result of the matching information synthesizer 430, the matching information may be added to original texture information included in the base frame. An output frame output from the matching information synthesizer 430 may have an enhanced texture component compared to an input frame. Texture information included in the output frame may be expressed by, $$T_{out}(i,j) = T_{current}(i,j) + u \cdot p_{total}(i,j).$$ [Equation 2]

In Equation 2, i and j denote x, y coordinates of a pixel, $T_{out}$ denotes texture information of the output frame, $T_{current}$ denotes texture information of the base frame, $p_{total}$ denotes matching information as expressed in above Equation 1, and u denotes a gain value. u may be set to a value indicating a visually natural result by measuring, through a pre-experiment, an enhanced level of a texture component according to synthesizing of matching information.

It is described above with reference to FIG. 1 that the texture information provider 110 provides both texture information of a base frame and texture information of a reference frame. However, it is only an example and thus separate constituent elements may provide the base frame and the reference frame, respectively. For example, referring to FIG. 7, an image processing apparatus 700 may further include a storage 710 to store texture information provided by the texture information provider 110. The storage 710 may include a non-volatile memory such as a flash memory or a volatile memory such as a random access memory (RAM). It is understood that the storage 710 may be a buffer.

Figure 7:
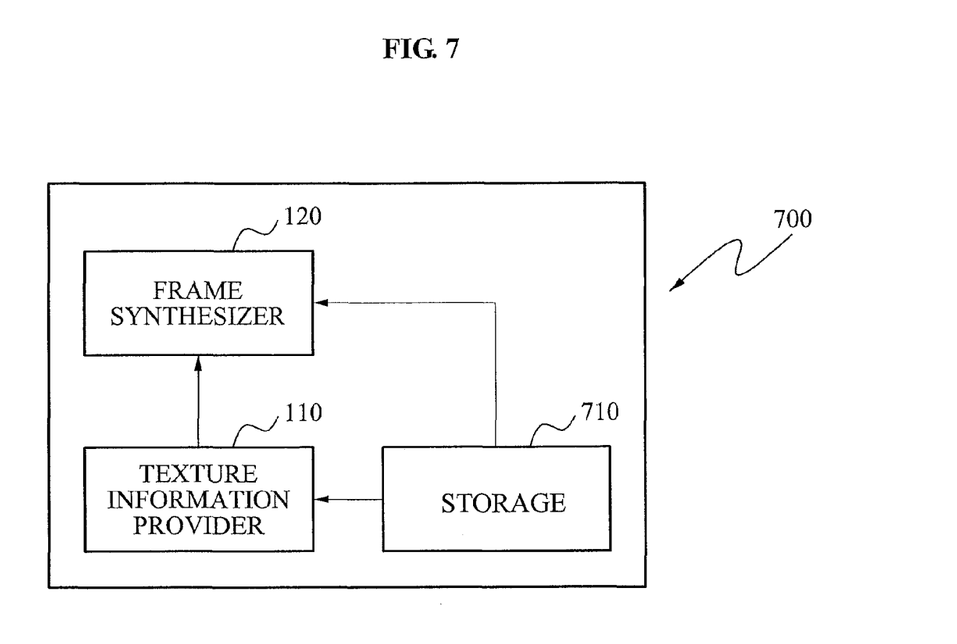
FIG. 7 illustrates an image processing apparatus according to another embodiment.

In FIG. 7, the texture information provider 110 may provide texture information of a base frame. The buffer 710 may provide texture information of a reference frame obtained in advance from the texture information provider 110.

Various types of modifications may be applicable. For example, the buffer 710 may be configured to provide both texture information of the base frame and texture information of the reference frame. Also, by including another texture information provider (not shown) instead of the buffer 710, a plurality of texture information providers may be configured to provide texture information of the base frame and texture information of the reference frame, respectively.

Figure 8:
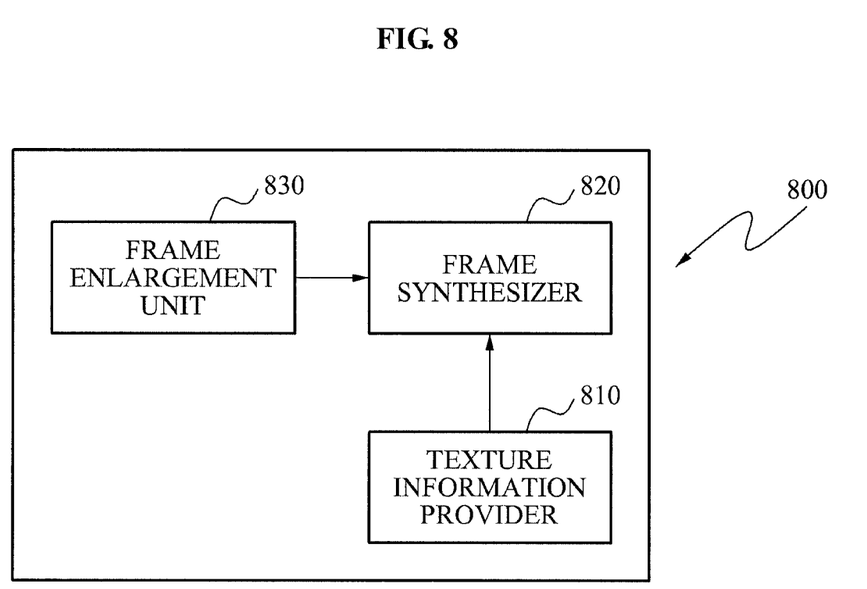
FIG. 8 illustrates an image processing apparatus according to still another embodiment.

FIG. 8 illustrates an image processing apparatus 800 according to still another embodiment. The image processing apparatus 800 may include a texture information provider 810, a frame synthesizer 820, and a frame enlargement unit 830.

The frame enlargement unit 830 may increase a resolution of an input frame. When a low resolution frame is input, the frame enlargement unit 830 may provide a high resolution frame corresponding to the low resolution frame. Here, the term "low resolution" or "high resolution" indicates a relative resolution difference between frames provided by the frame enlargement unit 830. The resolution may not be particularly limited when the low resolution frame and the high resolution frame are defined. The frame enlargement unit 830 may include a scaler employing a linear interpolation scheme. Another method may be employed to enlarge the frame. Various types of frame enlargement methods may be used by the frame enlargement unit 830.

The texture information provider 810 may provide texture information of an input frame, and may include a configuration and function of the texture information provider 110 of FIG. 1. The texture information provider 810 may further include a texture enlargement unit (not shown) to enlarge the texture information.

Figure 9:
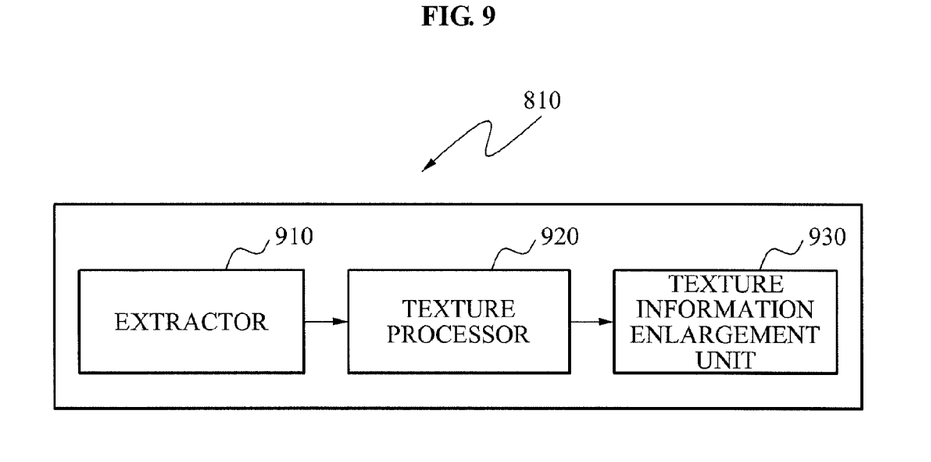
FIG. 9 illustrates an embodiment of a texture information provider of FIG. 8.

FIG. 9 illustrates an embodiment of the texture information provider 810 of FIG. 8. Referring to FIG. 9, the texture information provider 810 may include an extractor 910, a texture processor 920, and a texture information enlargement unit 930.

The extractor 910 may extract texture information included in an input frame. The texture processor 920 may enhance the extracted texture information. The extractor 910 and the texture processor 920 may correspond to the extractor 210 and the texture processor 220 of FIG. 2 and thus further detailed description related thereto will be omitted here.

The texture information enlargement unit 930 may enlarge texture information output from the texture processor 920 by a scale of the input frame enlarged by the frame enlargement unit 830. Enlarging of the texture information may indicate increasing a resolution of a frame including the texture information as described above with reference to FIG. 5. According to another embodiment, the texture enlargement unit 930 may be provided between the extractor 910 and the texture processor 920 to enlarge texture information provided by the extractor 910, and to provide the enlarged texture information to the texture processor 920.

Referring to FIG. 8, the frame synthesizer 820 may synthesize texture information provided by the texture information provider 810 with the input frame enlarged by the frame enlargement unit 830. A configuration and function of the frame synthesizer 820 may be understood from the frame synthesizer 120 of FIGS. 1 and 4. A motion vector used to generate matching information may also be up-scaled by a scale enlarged from a low resolution image to a high resolution image, and thereby be used.

When the high resolution image is generated by enlarging the low resolution image, it is possible to prevent a blur phenomenon occurring in a texture area of the high resolution image.

Figure 10:
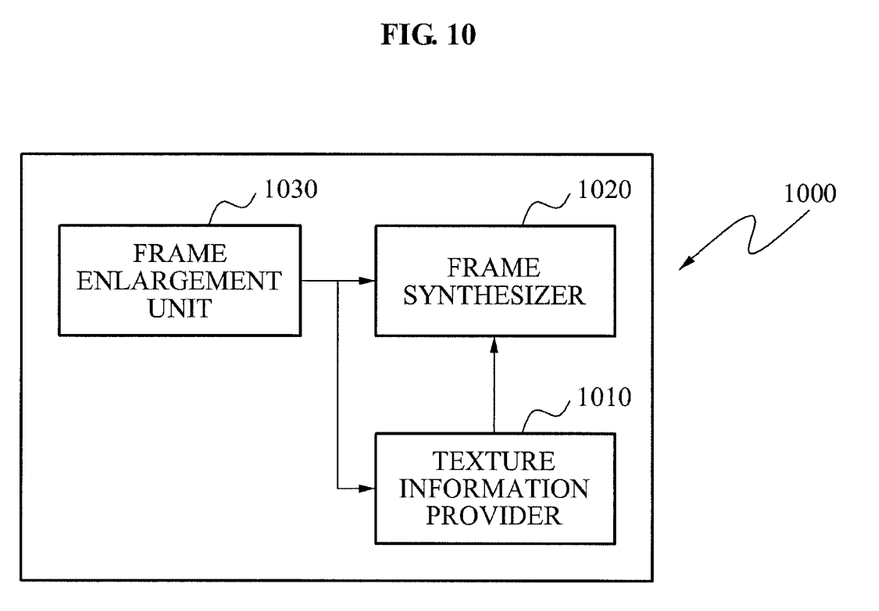
FIG. 10 illustrates an image processing apparatus according to yet another embodiment.

FIG. 10 illustrates an image processing apparatus 1000 according to yet another embodiment. The image processing apparatus 1000 may include a texture information provider 1010, a frame synthesizer 1020, and a frame enlargement unit 1030.

The frame synthesizer 1020 and the frame enlargement unit 1030 may have the same configuration and function as the frame synthesizer 820 and the frame enlargement unit 830 of FIG. 8, respectively, and thus further detailed description related thereto will be omitted here.

The texture information provider 1010 may extract texture information from an input frame enlarged by the frame enlargement unit 1030, and may provide the extracted texture information to the frame synthesizer 1020. What is different between the texture information provider 1010 and the texture information provider 810 of FIG. 8, the texture information provider 1010 may not perform an operation of enlarging texture information. The texture information provider 1010 may extract texture information from an enlarged frame. Accordingly, the frame synthesizer 1020 may perform an operation of synthesizing texture information without enlarging again the texture information.

Figure 11:
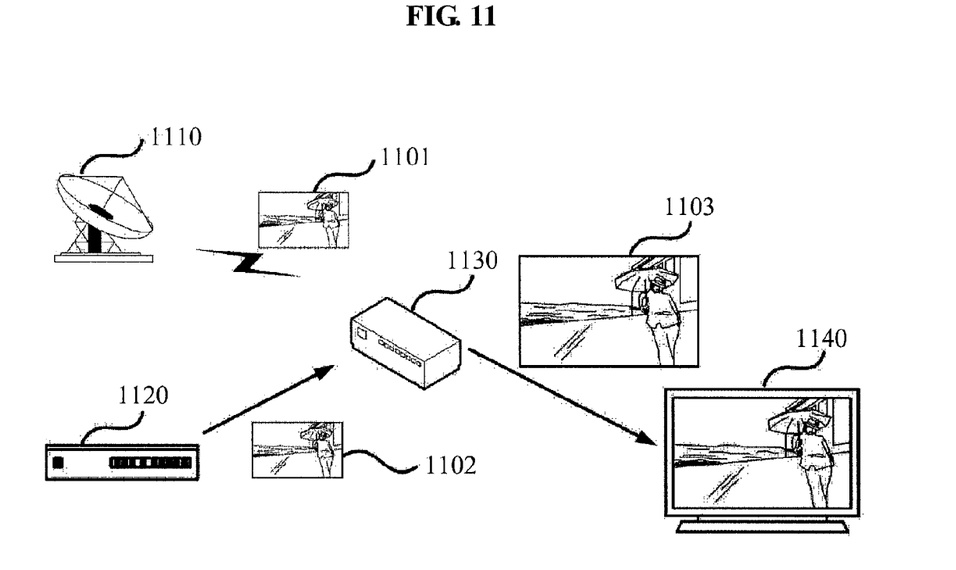
FIG. 11 illustrates an application example of an image processing apparatus according to an embodiment.

FIG. 11 illustrates an application example of an image processing apparatus 1130 according to an embodiment. The image processing apparatus 1130 may receive a high definition (HD) image 1101 from a broadcasting station 1110, or may receive an HD image 1102 from a media player 1120. The image processing apparatus 1130 may enlarge the HD images 1101 and 1102 to be an ultra definition (UD) image 1103, and may also enhance a texture component. The UD image 1103 with the enhanced texture component may be transferred to a UD television 1140. The UD television 1140 may display the provided UD image 1103. Although FIG. 11 illustrates the image processing apparatus 1130 as an independent digital apparatus, the image processing apparatus 1130 may be modulated and thereby be included in other digital apparatuses such as the media player 1120, the UD television 1140, and the like. The image processing apparatus 1130 may include at least one of configurations and functions described above with reference to FIGS. 1 through 10.

According to another embodiment, the image processing apparatus 1130 may provide an output image with an enhanced texture component without changing a resolution of an input image.

Figure 12:
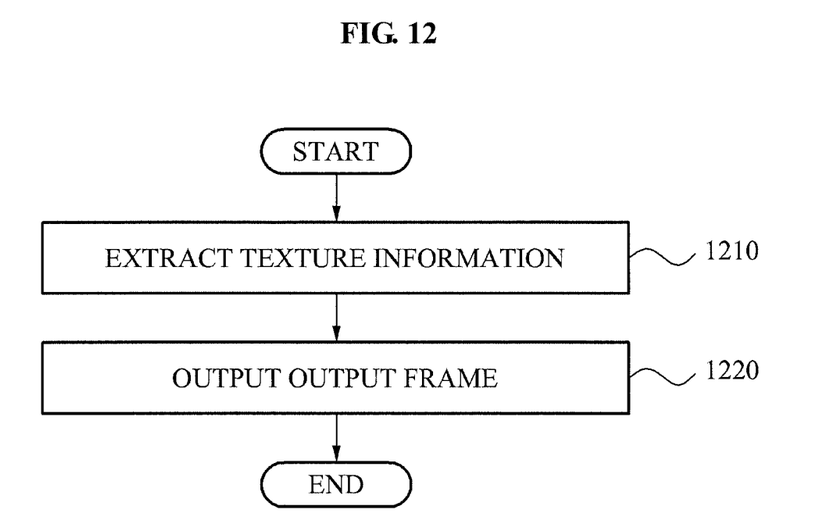
FIG. 12 illustrates an image processing method according to an embodiment.

FIG. 12 illustrates an image processing method according to an embodiment.

In operation 1210, an image processing apparatus may extract texture information from an input frame. The extracted texture information may have a value with an enhanced texture component compared to original texture information included in the input frame.

In operation 1220, the image processing apparatus may output an output frame containing the extracted texture component. The output frame may include the texture component of the input frame and a texture component of another frame, for example, a reference frame. Operation 1210 may be performed by a texture information provider of the image processing apparatus, for example, the texture information provider 110, 810, or 1010. Operation 1220 may be performed by a frame synthesizer of the image processing apparatus, for example, the frame synthesizer 120, 820, or 1020. Matters not described with reference to FIG. 12 may be understood from the description made above with reference to FIGS. 1 through 11. Also, the image processing method may further include enlarging the input frame, which may be performed by the frame enlargement unit 830 or 1030. It may also be predicted from the aforementioned embodiments.

The image processing method according to the above-described exemplary embodiments may be recorded in computer-readable media including program instructions to implement various operations embodied by a computer including a processor. The media may also include, alone or in combination with the program instructions, data files, data structures, and the like. Examples of computer-readable media include magnetic media such as hard disks, floppy disks, and magnetic tape; optical media such as CD ROM disks and DVDs; magnetooptical media such as optical disks; and hardware devices that are specially configured to store and perform program instructions, such as read-only memory (ROM), RAM, flash memory, and the like. Examples of program instructions include both machine code, such as produced by a compiler, and files containing higher level code that may be executed by the computer, which includes a processor, using an interpreter. The described hardware devices may be configured to act as one or more software modules in order to perform the operations of the above described exemplary embodiments, or vice versa.

Although a few exemplary embodiments have been shown and described, it would be appreciated by those skilled in the art that changes may be made in these exemplary embodiments without departing from the principles and spirit of the disclosure, the scope of which is defined by the claims and their equivalents.

What is claimed is:

1. An image processing apparatus, comprising:
a texture information provider to provide texture information of a first frame, using a processor;
a frame synthesizer to output a second frame containing the texture information of the first frame,
wherein the texture information of the first frame has a value with an enhanced texture component compared to an original texture information included in the first frame;
a motion information provider obtains a motion vector of a base area of the second frame, wherein the motion vector of the base area of the second frame indicates that a corresponding area of the first frame is the same as or most similar to the base area of the second frame, and wherein coordinates of the corresponding area of the first frame are different than coordinates of the base area of the second frame; and
a texture information matching unit to identify a reference area of the first frame having coordinates that correspond to the coordinates of the base area of the second frame, and to determine a matching area of the second frame, which indicates an area of the second frame where the reference area of the first frame is moved, based on an inverse of the motion vector of the base area of the second frame being applied to the reference area of the first frame,
wherein the texture information matching unit performs a texture information matching operation while changing the base area of the second frame, and wherein the texture information matching unit provides matching information using the texture information of the base area of the second frame and texture information of the reference area of the first frame.

2. The image processing apparatus of claim 1, wherein the frame synthesizer synthesizes the second frame with the matching information containing the texture information of the first frame, based on motion information of the second frame.

3. The image processing apparatus of claim 2, wherein the matching information comprises the texture information of the first frame and a texture information of the second frame.

4. The image processing apparatus of claim 1, wherein the texture information provider comprises an extractor processor and a texture processor.

5. The image processing apparatus of claim 4, wherein the extractor processor includes a filter unit.

6. The image processing apparatus of claim 5, wherein the filter unit comprises a low pass filter and a differentiator.

7. The image processing apparatus of claim 4, wherein the texture processor comprises a plurality of weighting units and a summation unit to sum an output of the plurality of weighting units.

8. The image processing apparatus of claim 1, further comprising:
a frame enlargement unit to increase a resolution of an input frame,
wherein the second frame corresponds to a frame enlarged by the frame enlargement unit.

9. The image processing apparatus of claim 8, wherein the texture information provider comprises:
an extractor to extract texture information from the first frame;
a texture processor to enhance a texture component included in the extracted texture information from the first frame; and
a texture information enlargement unit to enlarge the extracted texture information from the first frame including the enhanced texture component.

10. The image processing apparatus of claim 1, wherein the frame enlargement unit provides a high resolution frame to the frame synthesizer.

11. The image processing apparatus of claim 1, further comprising a storage to store the texture information received from the texture information provider.

12. The image processing apparatus of claim 1,
wherein the motion vector is determined based on encoding or decoding of one or more of the first frame and the second frame,
wherein the motion vector is the motion vector of the base area of the second frame,
wherein the motion vector of the base area indicates a corresponding area of the reference frame, and
wherein the inverse of the motion vector is determined based on the motion vector of the base area.

13. The image processing apparatus of claim 12, wherein the matching information is based upon the equation:

$$P_{total}(i-MV_{x,k}, j-MV_{y,k}) = P_{current}(i-MV_{x,k}, j-MV_{y,k}) + P_{reference}$$

wherein $P_{total}$ denotes matching information, wherein $P_{current}$ denotes texture information of the base area, wherein $P_{reference}$ denotes texture information of the reference area, wherein $MV_{x,k}$ denotes an x component of the motion vector, wherein $MV_{y,k}$ denotes a y component of the motion vector, wherein i denotes an x component of a pixel, and wherein j denotes a y component of a pixel.

14. The image processing apparatus of claim 1, wherein the texture information matching unit synthesizes texture information of the reference area of the first frame with texture information of the matching area of the second frame.

15. The image processing apparatus of claim 1, wherein the motion information provider obtains the motion vector of the base area of the second frame using block matching.

16. The image processing apparatus of claim 15,
wherein the block matching is performed during a coding operation of the base area or during a decoding operation of the base area, and
wherein the block matching determines that the base area of the second frame is the same or most similar to the corresponding area of the first frame.

17. The image processing apparatus of claim 1, wherein the second frame comes after the first frame.

18. An image processing method, comprising:
providing, by a texture information provider, texture information of a first frame, using a processor;
outputting, by a frame synthesizer, a second frame containing the texture information of the first frame,
wherein the texture information of the first frame has a value with an enhanced texture component compared to an original texture information included in the first frame;
obtaining, by a motion information provider, a motion vector of a base area of the second frame using block matching, wherein the motion vector of the base area of the second frame indicates that a corresponding area of the first frame is the same as or most similar to the base area of the second frame, wherein coordinates of the corresponding area of the first frame are different than coordinates of the base area of the second frame;
identifying, by a texture information matching unit, a reference area of the first frame having coordinates that correspond to the coordinates of the base area of the second frame;
determining a matching area of the second frame, which indicates an area of the second frame where the reference area of the first frame is moved, based on an inverse of the motion vector of the base area of the second frame being applied to the reference area of the first frame; and
synthesizing texture information of the reference area of the first frame with texture information of the matching area of the second frame,
wherein the texture information matching unit performs a texture information matching operation while changing the base area of the second frame, and the texture information matching unit provides matching information using the texture information of the base area of the second frame and texture information of the reference area of the first frame.

19. The image processing method of claim 18, wherein the outputting comprises:
generating matching information containing the texture information of the first frame, based on motion information of the second frame; and
synthesizing the second frame with the matching information.

20. The image processing apparatus of claim 19, wherein the matching information comprises the texture information of the first frame and texture information of the second frame.

21. The image processing method of claim 18, further comprising:
increasing a resolution of an input frame,
wherein the second frame corresponds to a frame enlarged by the frame enlargement unit.

22. The image processing method of claim 21, wherein the providing comprises:
extracting texture information from the first frame;
increasing a texture component included in the extracted texture information; and
enlarging texture information including the increased texture component.

23. A non-transitory computer-readable recording medium storing a program to implement the method of claim 18.

24. A method, comprising:
providing texture information of a first frame using a processor;
obtaining texture matching information;
combining a reference area of the first frame with a base area of a second frame identified by frame motion vectors;
adjusting the texture matching information with a gain value;
combining the gain adjusted texture matching information with base area of the second frame,
wherein texture information of the first frame has a value with an enhanced texture component compared to an original texture information included in the first frame;
obtaining a motion vector of the base area of the second frame, wherein the motion vector of the base area of the second frame indicates that a corresponding area of the first frame is the same as or most similar to the base area of the second frame, wherein coordinates of the corresponding area of the first frame are different than coordinates of the base area of the second frame;
identifying a reference area of the first frame having coordinates that correspond to the coordinates of the base area of the second frame; and
determining a matching area of the second frame, which indicates an area of the second frame where the reference area of the first frame is moved, based on an inverse of the motion vector of the base area of the second frame being applied to the reference area of the first frame,
performing a texture information matching operation while changing the base area of the second frame; and
providing matching information using the texture information of the base area of the second frame and texture information of the reference area of the first frame.

25. The method of claim 24, further comprising:
synthesizing texture information of the reference area of the first frame with texture information of the matching area of the second frame.

\* \* \* \* \*